United States Patent [19]
Keylwert

[11] 3,926,151
[45] Dec. 16, 1975

[54] ROTARY PISTON COMBUSTION ENGINE

[75] Inventor: Johann Keylwert, Bensberg, Germany

[73] Assignee: Klockner-Humboldt-Deutz AG, Cologne, Germany

[22] Filed: Dec. 2, 1974

[21] Appl. No.: 528,999

[30] Foreign Application Priority Data
Dec. 14, 1974 Germany............................ 2362092

[52] U.S. Cl. ............. 123/8.05; 60/39.61; 60/39.63; 123/8.15; 123/8.33
[51] Int. Cl.² ......................................... F02B 55/14
[58] Field of Search ....... 123/8.19, 8.27, 8.33, 8.15, 123/8.05; 60/39.61, 39.63, 39.43; 418/61 B

[56] References Cited
UNITED STATES PATENTS
3,775,031  11/1973  Hansen............................... 418/61 B
3,825,376  7/1974  Petersen et al..................... 418/61 B
3,867,911  2/1975  Keylwert............................ 123/8.15

*Primary Examiner*—William L. Freeh
*Assistant Examiner*—O. T. Sessions
*Attorney, Agent, or Firm*—Walter Becker

[57] ABSTRACT

A rotary piston combustion engine in which the housing surrounding the piston has internal lobes, while the piston has external lobes cooperating therewith to form working chambers. The rotary piston lobes in number equal a whole multiple of three and every third piston lobe has a bypass channel extending circumferentially therethrough. Passages formed in the piston cooperate with a combustion chamber formed in the housing to supply gas to the combustion chamber during contraction of the working chambers and to receive gas from the combustion chamber during expansion of the working chambers.

8 Claims, 3 Drawing Figures

ROTARY PISTON COMBUSTION ENGINE

The present invention relates to a rotary piston internal combustion engine with inner and parallel axis and with inter mesh, according to which sealing strips are arranged on the mantle and in which a piston is provided the cross sectional contour of which is determined by a trochoid with a plurality of arcs between which axis-near zones or lobes are arranged.

Internal combustion engines of this type are known. With internal combustion engines of this type, the gas change is in the first instance effected through passages in the piston and is controlled by control openings at the circumference of the piston. In the second instance the gas exchange is controlled by valves which control gas change passages in the housing.

The simple gear drive mechanism which rotary piston engines of the trochoidal structure have can be carried out with particular saving of weight when combustion methods are employed which get by with low maximum pressures in the working chamber.

This can also be realized with high compression ratio when the release of heat is during the working cycle controlled so slowly that no material increase in pressure in the working chamber is effected by the compression end pressure. The same goal of an "equal pressure combustion" can be reached when the combustion itself is effected continuously outside the working chambers in a central combustion chamber, and when only the pressure conversion is effected in the working chambers. To this end, the working gas has to be displaced from the working chambers into the combustion chamber and back again into the working chambers. This is expediently effected at constant pressure. Unfortunately, the aimed-at working process of the equal pressure combustion has poor process degree of efficiency due to the fact that automatically the expansion starts too late and has a shortened course up to the working piston reaching its lower dead center point.

It is, therefore, an object of the present invention, especially with internal combustion engines comprising the above describe pressure course in the working chamber, to extend the expansion cycle and compression cycle. These and other objects and advantages of the invention will appear more clearly from the following specification in connection with the accompanying drawings, in which.

Figure 1:
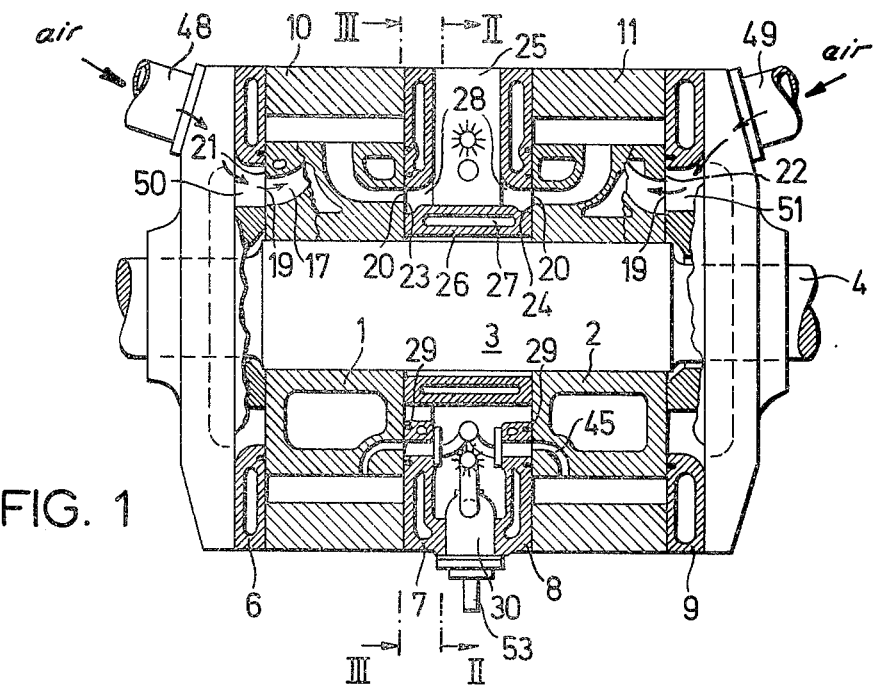
FIG. 1 is a longitudinal section through a rotary piston internal combustion engine according to the invention, in which two pistons are journalled on a common eccentric.
Figure 2:
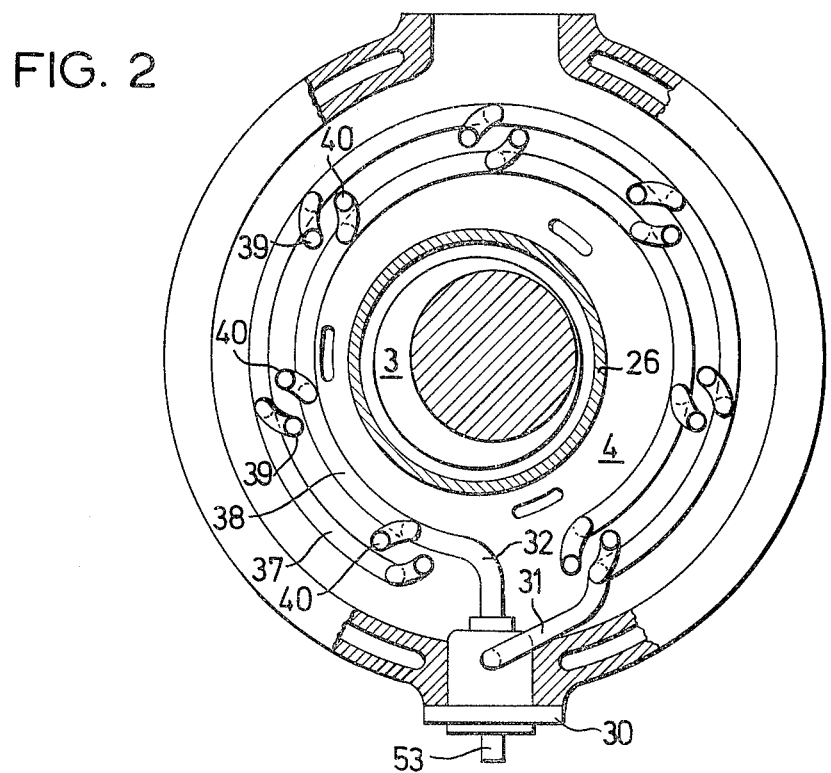
FIG. 2 represents a section taken along the line II—II of FIG. 1.

The above outlined objects have been realized according to the present invention by the fact that the number of the arcs of the trochoid is divisible by three and that the circumference of the pistons within the region of every third arc has an overflow passage extending in circumferential direction, said overflow passage extending approximately from one axis-near zone to the next axis-near zone.

With the design of the piston according to the present invention, two working chambers can be coupled to each other by an overflow passage in such a way that during the expansion, first only the volume of one working chamber increases, whereas after passing over the radial seal located between two working chambers, a common volume increase of the two adjacent working chambers through the overflow passage is effected. The expansion is completed when the total of both voluminae has reached a maximum.

The same processes may be realized with a reverse sequence, also during the compression cycle. In this instance, the volume of two adjacent working chambers interconnected by an overflow passage decreases together, whereas after the radial sealing strip located between the working chambers is passed over, the compression of the working medium is contained in the working chamber through the overflow passage. Depending on how the sequence of the piston arcs with overflow passage is located relative to the piston arcs with inlet and outlet opening for the gas change in relation to the movement of the piston, an extension of the expansion or compression cycle can be realized. The internal combustion engine operates in conformity with a six-stroke cycle.

It is, however, also possible at the same time to provide overflow passages for the extension of the compression cycle and also of the expansion cycle. In this instance, the piston has a number of arcs divisible by four.

According to a further development of the invention, it is suggested that the piston has inlet and outlet passages which connect the inlet and outlet openings in the end faces of the piston with the inlet and outlet control openings which are arranged at the circumference of the piston near the axis-near zones of the arcs which in the direction of rotation of the piston are located behind the arcs with the overflow passages. Due to this feature, the expansion cycle is extended or prolonged in the manner according to the invention, while the gas exchange is controlled by control openings at the circumference of the piston, such control openings being known per se.

In order to protect the radial sealing strips against the overflow of the combustion gases during the expansion, to a maximum extent, or in order to be able favorably to influence the movement of the overflowing combustion air or gases in a favorable manner, it is advantageous to cover the overflow passages at the circumference of the piston with the exception of end-wise openings within the region of the axis-near zones. The passages may be lined by heat insulating material.

According to a further development of the invention, it is suggested that the internal combustion engine has a common housing-connected combustion chamber. This combustion chamber communicates with working chambers through two conduit systems each having a mouth opening leading into piston adjacent end faces of the lateral parts of the housing between an inner and outer axial seal. This combustion chamber furthermore communicates with said working chambers through change-over passages in the piston. Each of said change-over passages has a mouth opening at the piston circumference on the arcs which in direction of rotation are located ahead of the arcs with the overflow passages, and also on one end face of the piston. The path curve of the mouth openings at the end face being located outside the inner axial seal, and the mouth openings of the two conduit systems in the lateral parts of the housing successively overflow.

Referring now to the drawings in detail, the illustrated internal combustion engines represent inner and parallel axis rotary piston internal combustion engines engaging each other.

Figure 3:
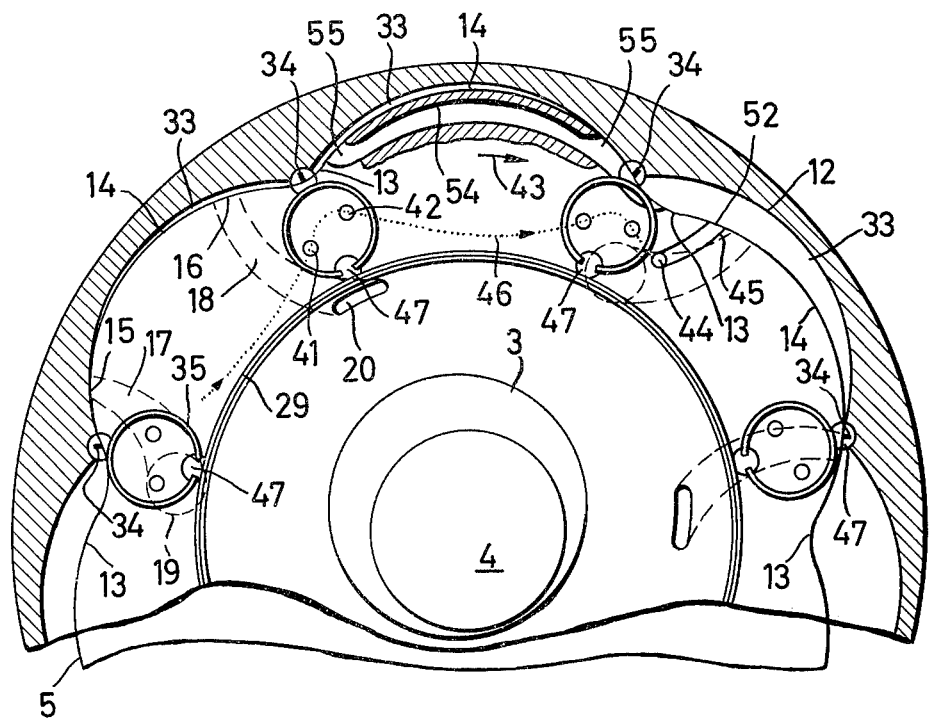
FIG. 3 illustrates on an enlarged scale a section within the region of the line III—III of FIG. 1, the contour of the piston being shown in thin lines and the projections of the inlet, outlet, charge changing and overflow passages being shown in dash lines.

The internal combustion engine according to FIG. 1 comprises two pistons 1 and 2 which are mounted on a common eccentric of an eccentric shaft 4 and the cross sectional contour 5 of which (FIG. 3) is determined by a six-arc epitrochoid. The eccentric shaft 4 is journalled in a housing which consists primarily of lateral parts 6,7,8,9, and of mantles 10 and 11 arranged therebetween. The inner cross sectional confinement 12 (FIG. 3) of the mantles 10 and 11 is determined by the outer enveloping curve of the cross sectional contour 5 of pistons 1 and 2. Due to the given geometric shapes, the circumference of the pistons 1,2 are divided into uniform arcs 14 by a number divisible by three of axis-near zones 13. Each third one of said arcs 14 is provided with inlet control openings 15 and with outlet control openings 16, said inlet and outlet control openings being connected by passages 17 and 18 in pistons 1 and 2 with inlet openings 19 and outlet openings 20 provided in the end faces 21, 22; 23, 24 of the pistons 1 and 2. The outlet openings 20 are consequently provided in the end faces 23 and 24 facing each other. The lateral parts 7 and 8 are combined to one structural element and form a collecting chamber 25 which is sealed relative to the eccentric 3 by a sleeve 26 connecting the pistons 1 and 2 with each other. The sleeve 26 may be designed so strong that it can serve for equalizing the torque of the two pistons 1, 2. In the illustrated embodiment, the sleeve 26 comprises a cooling chamber 27.

The collecting chamber 25 is in continuous communication with the outlet openings 20 through annular gaps 28, the path curves of said outlet openings being surrounded by an inner axial seal 29.

Inserted into the collecting chamber 25 is a combustion chamber 30 for both pistons 1 and 2 which is fixedly connected to the housing and which communicates through two conduit systems 31 and 32 with working chambers 33. The working chambers 33 are formed by the circumferential surface of the piston, the inner mantle surface, and the corresponding ranges of the lateral parts and are sealed relative to each other by radial sealing strips 34 arranged at the mantles 10 and 11, and are furthermore sealed relative to each other by axial seals 29, 35 and 36 arranged in the parts 6, 7, 8 and 9.

The conduit systems 31 and 32 consist primarily of an annular conduit 38; 37 from which branch off branches 39;40 leading to mouth openings 41;42 in the lateral parts 7 and 8. During the rotation of the pistons 1, 2 in the direction indicated by the arrow 43, the mouth openings 41 and 42 are passed over by mouth openings 44 of pertaining change-over passages 45 which latter are located in the end face 23, 24 of the pistons 1 and 2. The path curve 46 of the mouth openings 44 is dotted in FIG. 3. From FIG. 3 it will be seen that the mouth openings 41 and 42 are relative to the upper dead center point in the path curve 46 so arranged that the mouth openings 41 are passed over by the mouth openings 44 ahead of the upper dead center point of the pistons and that the mouth openings 42 are passed over past the upper dead center point.

Instead of the illustrated embodiment with a change-over passage 45 for one arc 14 and two overflow openings 41 on the path curve 46, it is also possible for preventing flow reversal in the change-over passage 45, to provide two change-over passages the mouth openings of which in the end face described either path curves in different end faces of a piston or describe radially offset path curves on which corresponding mouth openings are located in the lateral parts of the housing. The mouth openings 41 and 42 are surrounded by annular axial seals 35 which through sealing bolts 47 engage the inner axial seal 29 and the radial sealing strips 34.

Viewed in the direction of rotation, ahead of the arc with the inlet and outlet control openings 15 and 16 there is provided a piston arc with an overflow passage 54 which toward the working chamber 33 is with the exception of two openings 35 in the end face covered within the region of the axis-near zones 13.

The operation of the rotary piston combustion engine is as follows:

Fresh air is during the increase in volume of the corresponding working chambers 33 drawn in through suction conduits 48, 49 on the lateral part 6, 9 through feeding passages 50, 51, inlet openings 19, inlet passages 17, and inlet control openings 15. When the control opening 15 passes over that sealing strip 34 which is closed in the direction of rotation, the intake stroke has been completed. During the further rotation of the piston, the fresh air in the working chamber 33 is compressed until the change-over passage 45 with its mouth opening 44 at the end face side moves over the mouth opening 41, and through its mouth opening 52 at the circumference of the piston establishes communication with the working chamber 33. The decrease in volume of the working chamber 33 during the movement of the mouth opening 44 over the mouth opening 41 serves for conveying compressed air through the conduit system 39 into the combustion chamber 30. Due to the shape and position of the mouth opening 41, this operation can be changed in conformity with the requirements of the engine. The fresh air arriving in the combustion chamber 30 serves for combusting the fuel which is introduced through a connection 53. The volume of the combustion chamber 30 is so selected that even during a load change, a continuous combustion can be effected.

During the further rotation of the pistons, the mouth opening 44 moves over the mouth opening 42 after it has passed that point of the path curve 46 which corresponds to the dead center point position of the piston. During this operation a volume of hot exhaust gas is withdrawn from the combustion chamber 30 due to the fact that the working chamber 3 increases while the mouth opening 42 is passed over. This exhaust gas is expanded during the further portion of the cycle. After a certain increase in volume of the working chamber 33, an opening 55 of the overflow passage 54 moves over the nearest radial seal 34 when viewed in the direction of rotation of the piston. As a result thereof the working chamber which is involved in the expansion cycle is connected with the working chamber which in the direction of rotation of the piston is lying back, and increases together with said last mentioned working chamber to a maximum. The discharge stroke starts when the outlet control opening 16 has passed over the nearest sealing strip 34 when viewed in the direction of rotation 43 of the piston. During the further course, the working cycle is repeated and the working stroke starts with a moving of an inlet control opening 15 over that sealing strip 34 which is the nearest one when viewing in the direction of rotation.

It is, of course, to be understood that the present invention is, by no means, limited to the specific showing in the drawings but also comprises any modifications within the scope of the appended claims. In this connection, it is to be noted that the invention is also applicable with rotary piston internal combustion engines in which the gas change-over is effected through valve control passages provided in the housing of the internal combustion engine.

What is claimed is:

1. A rotary piston internal combustion engine comprising; housing means, piston means in the housing means and a shaft rotatably supported on the axis of the housing means and having eccentric means supporting said piston means, whereby relative rotation between said eccentric means and said piston means effects a change in the volume of fluid between said housing means and said piston means, said housing means when viewed in cross section comprising a plurality of radially inwardly concave arched regions, said piston means when viewed in cross section comprising radially outwardly convex arched regions amounting in number to a whole multiple of three, said piston means having intermediate portions at the junctures of adjacent arched regions which are nearest the axis of the piston means, said piston means being provided with overflow passage means extending circumferentially thereof and leading from near each third said intermediate portion of the piston means to near the following said intermediate portion of the piston means in the direction of rotation of the piston means, said overflow passage means providing fluid communication between two of said arched regions, conduit means for supplying a combustible mixture to the working chamber means formed between the piston means and housing means and for withdrawing products of combustion therefrom, combustion chamber means, and first and second conduit systems communicating said combustion chamber means with said working chamber means.

2. A rotary piston internal combustion engine according to claim 1 in which said conduit means include inlet and outlet passage means formed in said piston means which at one end open through at least one end face of said piston means, said passage means at the other end terminating in control openings at the periphery of said piston means, one of said control openings being circumferentially near the said intermediate regions at the trailing end of said overflow passage means taking into account the direction of rotation of the piston means and the other of control openings being near the next following said intermediate region.

3. A rotary piston internal combustion engine according to claim 1 in which each said overflow passage means is closed on the radially inner and outer sides except at the ends and which ends comprise radially outwardly opening ports.

4. A rotary piston internal combustion engine according to claim 3 which includes heat insulating material lining said overflow passage means.

5. A rotary piston internal combustion engine according to claim 1 in which said piston means comprises a pair of axially spaced pistons, said housing means including a member between said pistons, said combustion chamber means in said member, said first and second conduit systems being in said member leading from said combustion chamber means to the adjacent ends of said pistons for communication with said working chamber means, each conduit system having port means opening toward the adjacent end face of each piston, each port means of said first conduit system being adjacent a said port means of said second conduit system to form a pair of port means, change over passages in said piston each of which has a first port on the piston circumference in the arched region ahead of the intermediate region of the respective piston pertaining to the leading end of a respective overflow passage means of the piston, each change over passage having a second port on the end of the respective piston which communicates with the port means of said first conduit system of a pair of the port means while the working chamber means with which the respective first port communicates is contracting and with the port means of said second conduit system of the respective pair of port means while said working chamber means is expanding.

6. A rotary piston internal combustion engine according to claim 5 which includes seal means on said member surrounding each said pair of port means.

7. A rotary piston internal combustion engine according to claim 6 which includes an annular seal means on said member radially inward from said pairs of port means.

8. A rotary piston internal combustion engine according to claim 5 in which said pairs of port means are circumferentially within the region of the juncture of the arched regions of said housing means.

* * * * *